(No Model.)
D. O'LEARY.
GRINDSTONE HANGER.
No. 383,977. Patented June 5, 1888.
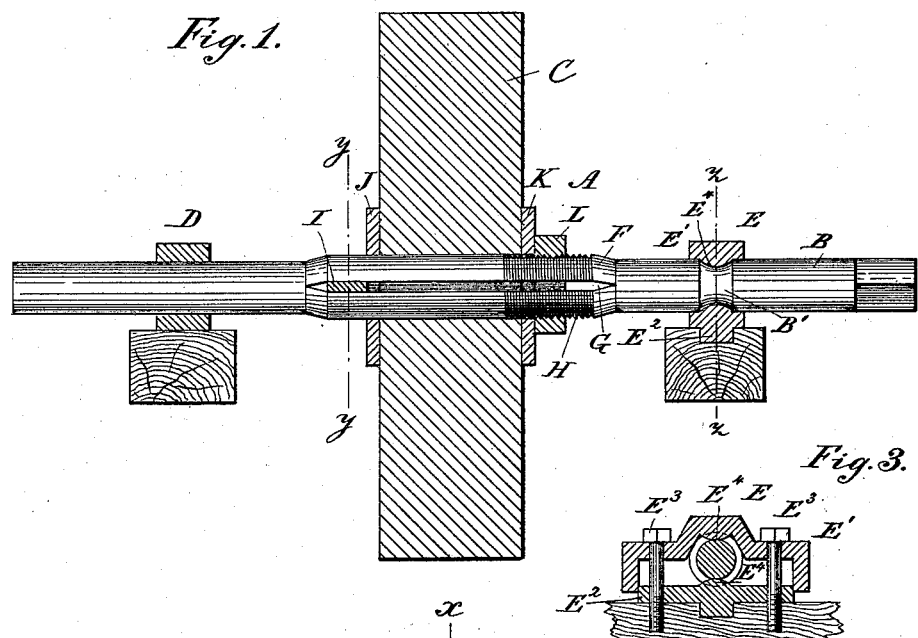
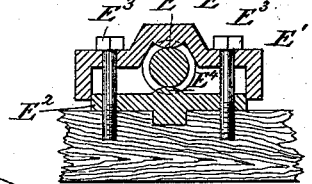
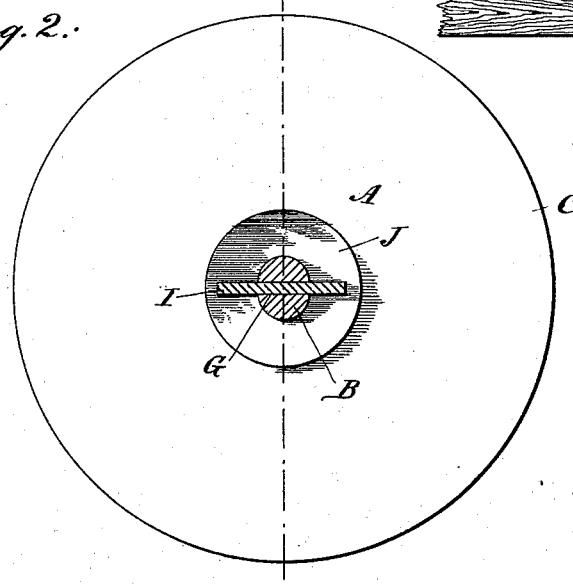
WITNESSES:
D. C. Reusch.
C. Sedgwick
INVENTOR:
D. O'Leary
BY Munn & Co
ATTORNEYS.

UNITED STATES PATENT OFFICE.

DENNIS O'LEARY, OF SAN BERNARDINO, CALIFORNIA.

GRINDSTONE-HANGER.

SPECIFICATION forming part of Letters Patent No. 383,977, dated June 5, 1888.

Application filed November 25, 1887. Serial No. 256,120. (No model.)

*To all whom it may concern:*

Be it known that I, DENNIS O'LEARY, of San Bernardino, in the county of San Bernardino and State of California, have invented a new and Improved Grindstone-Hanger, of which the following is a full, clear, and exact description.

The object of my invention is to provide a new and improved grindstone-hanger which is simple and durable in construction and holds the stone securely and accurately in place.

The invention consists of a split shaft supporting the stone, washers held on a split shaft, a nut screwing against one of the washers, and a key pressing against the other washer to hold the stone securely in place on the split shaft.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a vertical cross-section of my improvement on the line $x\ x$ of Fig. 2. Fig. 2 is a sectional side elevation of the same on the line $y\ y$ of Fig. 1, and Fig. 3 is a sectional side elevation of one of the bearings of the grindstone-shaft on the line $z\ z$ of Fig. 1.

My improved grindstone-hanger A is provided with a shaft, B, having its bearings in the boxes D and E, of which the former is a plain box of any suitable construction, while the box E is made in two parts, E' and $E^2$, held together by bolts $E^3$ screwing into the timber supporting the box E. On each part E' and $E^2$ is formed a convex shoulder, $E^4$, fitting into an annular concave groove, B', formed in the shaft B, as shown in Figs. 1 and 3. The shoulders $E^4$, fitting into the said groove B', prevent an endwise movement of the shaft B in its bearings E and D.

The shaft B is provided between the boxes D and E with the raised part F, which is split in its middle part, forming the slot G, which imparts an oblong shape to the cross-section of said raised part F, as shown in Fig. 2. The part F is provided with a screw-threaded portion, H, which, when cut by the threading-die, is deeper at the elongated ends of the raised part F than at the ends of the slot G. Into one end of the slot fits a key, I, projecting at each end beyond the part F, and resting at its inner edge against a washer, J, provided with an oblong aperture, which corresponds with the shape of the raised part F of the shaft B. The inner face of the washer J fits against one side of the grindstone C, held on said raised part F of the shaft B, and on the other face of the grindstone C is held a washer, K, also provided with an oblong aperture to fit over the oblong shape of the part F. Against the washer K screws a nut, L, screwing on the threaded part H of the raised part F of the shaft B.

It will be seen that the washers J and K, on account of their oblong apertures, are prevented from turning on the shaft B, and when the nut L is screwed up on the threaded portion H and against the washer K the latter forces the grindstone C tightly against the washer J and the latter is tightly held against the key I.

It will further be seen that by screwing the nut L up on the threaded portion H the latter causes a binding on the nut L, on account of the oblong shape of the part F, on which said threads H are formed. The nut L is thus securely held in place.

If desired, a key, I, may also be driven in front of the nut L at the other end of the slot G. In order to tighten the several parts, I can either screw up the nut L or drive in the key I.

Having thus fully described my invention, I claim as new and desire to secure by Letters Patent—

1. In a grindstone-hanger, a shaft provided with a split portion having an oblong cross-section and supporting the stone, substantially as shown and described.

2. In a grindstone-hanger, the combination, with a shaft having a split portion formed by a diametrical slot, of a key held in said slot, washers held on said oblong portion, and between which is held the grindstone, and a nut screwing on the threaded portion of said slotted oblong part of the shaft, substantially as shown and described.

DENNIS O'LEARY.

Witnesses:
I. BENJAMIN,
GEO. L. HISOM.